United States Patent
Aosaki et al.

[11] Patent Number: 6,006,040
[45] Date of Patent: Dec. 21, 1999

[54] SHUTTER DEVICE FOR CAMERA

[75] Inventors: Ko Aosaki; Naoyuki Nishinou; Yukitaka Takeshita, all of Saitama, Japan

[73] Assignee: Fuji Photo Film Co., Ltd., Kanagawa, Japan

[21] Appl. No.: 09/144,340

[22] Filed: Aug. 31, 1998

[30]  Foreign Application Priority Data

Aug. 29, 1997  [JP]  Japan ................................. 9-234040

[51] Int. Cl.$^6$ .............................................. G03B 7/087
[52] U.S. Cl. .................................................. 396/242
[58] Field of Search .................... 396/242, 243, 396/244, 235, 236, 240, 260, 213

[56]  References Cited

U.S. PATENT DOCUMENTS 5,287,140  2/1994  Kohno ..................................... 396/242
5,794,085  8/1998  Nomura et al. ..................... 396/242 X

*Primary Examiner*—W. B. Perkey
*Attorney, Agent, or Firm*—Young & Thompson

[57] ABSTRACT

A shatter device includes an exposure opening. Shutter blades slide in an opening direction to a maximum open position to open the exposure opening so as to provide an exposure. Then the shutter blades slide in a closing direction to close the exposure opening. An opening diameter is determined in accordance with the maximum open position, and is controlled smaller according to highness of subject brightness. A solenoid slides the shatter blades in the opening direction. A position detecting photo interrupter detects a reach of the shutter blades to a reference position while the solenoid slides the shutter blades in the opening direction. A controller obtains a timer time in accordance with the subject brightness, and starts measuring elapsed time in response to a signal from the photo interrupter. The solenoid is turned off when the measured elapsed time comes up to the timer time while the shutter-blades are slid further in the opening direction. Thereafter the shutter-blades are slid by inertia to the maximum open position, and then slid in the closing direction. Tho reference position is so predetermined that the maximum open position is changeable in a range limited by one limit open position located in the closing direction. The shutter blades, when located in the limit open position, open the exposure opening to a small extent. Thus opening operation of the shutter blades for the exposure opening is ensured even when the timer time is small.

21 Claims, 14 Drawing Sheets

SHUTTER DEVICE FOR CAMERA

BACKGROUND OF THE INVENTION

1. Field of the Invention

The present invention relates to a shutter device for a camera. More particularly, the present invention relates to a shutter device for a camera in which shutter blades can open without failure even when exposure time is very short.

2. Description Related to the Prior Art

Some types of compact cameras or instant cameras incorporate a program shutter, of which shutter blades are used also for controlling an exposure amount. A program shutter is constructed to take an exposure according to a predetermined combination of an aperture stop and a shutter speed respectively for each exposure value. Two or more shutter blades are combined and simultaneously opened/closed by means of a motor, a solenoid or other actuators. Open time or timer time of the shutter blades is determined in accordance with the exposure value. An opening diameter of the shutter blades corresponds to the aperture stop. A moved amount of the shutter blades is determined by the timer time. The opening diameter is increased and decreased according to the moved amount of the shutter blades. This is a widely used technique with considerable simplicity and convenience.

In FIG. 15, states of driving the program shutter according to the prior art are illustrated. A curve S4 indicates a relationship between an elapsed time and a change in a moved position (the moved amount) of the shutter blades. Sign D0 designates a moving position where a shutter opening starts being formed between the shutter blades. When exposure value EV is calculated by photometric operation, then the timer time T0 is uniquely determined. When a trigger signal is generated by a user's releasing operation of the shutter device, the motor starts rotating in a forward direction. Then the shutter blades are moved in an opening direction. Upon the start of the forward rotation of the motor, the timer time T0 starts being measured.

When the moved amount of the shutter blades increases for the shutter blades to come to the moving position D0, then the shutter blades starts forming the shutter opening. When the moved amount further increases, the opening diameter also increases. Upon the finish of measuring the timer time T0, a shutter-close signal is generated. The motor, in response to the shutter-close signal, is caused to rotate in reverse. The shutter blades, having been moved in the opening direction, now move in a closing direction, and finally come back to a closed position. One sequence of opening/closing operation is finished. Note that, immediately after the occurrence of the shutter-close signal, inertia and various factors move the shutter blades farther in the opening direction. Of course one exposure is being taken while the shutter blades are coming in the closing direction. In consideration of those various steps, the timer time T0 is predetermined. It is possible to control the exposure amount only by determining the timer time T0 according to the exposure value EV even with a comparatively simple construction.

However there is a problem in remarkable changes in an operating state of the shutter blades in the course of the opening/closing operation. Those changes are due to various causes including a difference in the orientation of manually holding the instant camera, changes in friction between the shutter blades, changes in friction between a shutter base plate and the shutter blades, differences between plural individual shutter blades, changes of the shutter blades with time, changes in environmental conditions for use of the shutter blades, and changes in response of the actuator. Especially when the shutter blades start being moved in the opening direction, the time point of the start of the shutter blades or the moving speed of the shutter blades are likely to change, because the state of rest of the shutter blades changes to the moving state.

If the shutter blades start being moved less quickly or are moved less quickly upon the start of their operation, the shutter blades operate in the manner indicated by a curve S5 of FIG. 15. If an exposure is taken with the timer time T0 associated with the photometrically obtained exposure value EV with the shutter blades of the curve S5, then it results in the under-exposure relative to the exposure with the shutter blades according to the curve S4. Also another most unacceptable state may occur in which the shutter blades come back in the closing direction without forming the shutter opening as indicated in a curve S6. This is remarkably frequent when a subject brightness of a photographic subject is very high. The opening diameter is controlled to be small for high subject brightness, to shorten the timer time T0 to reduce the moved amount of the shutter blades. A problem lies in that no exposure is taken even by exposure-taking sequence, due to failure in the opening operation of the shutter blades.

It may be conceivable that, in order to solve such a problem, a lower limit is predetermined for inhibiting the timer time T0 from coming lower than it. At least the smallest size of the shutter opening could be formed. But this is unacceptable because of ineffectiveness in controlling an exposure with high brightness, which has been possible according to the known techniques.

SUMMARY OF THE INVENTION

In view of the foregoing problems, an object of the present invention is to provide a shutter device for a camera in which shutter blades can open without failure even when an opening to be formed between the shutter blades is very small.

In order to achieve the above and other objects and advantages of this invention, a shutter device includes an exposure opening, and at least one shutter blade for moving in an opening direction to a maximum open position to open the exposure opening so as to provide an exposure, then the shutter blade moving in a closing direction to close the exposure opening, an opening diameter being determined in accordance with the maximum open position, the opening diameter being controlled smaller according to highness of subject brightness. An actuator moves the shutter blade in the opening direction. A position detector detects a reach of the shutter blade to a reference position while the actuator moves the shutter blade in the opening direction. A controller obtains a timer time in accordance with the subject brightness, for starting measuring elapsed time in response to a signal from the position detector, and for changing over the actuator when the measured elapsed time comes up to the timer time while the shutter blade is moved further in the opening direction, thereafter the shutter blade being moved by inertia to the maximum open position, and then moved in the closing direction. The reference position is so predetermined that the maximum open position is changeable in a range limited by one limit open position located in the closing direction, wherein the shutter blade, when located in the limit open position, opens the exposure opening to a small extent, so as to ensure opening operation of the shutter blade for the exposure opening even when the timer time is small.

The reference position is predetermined by sequential steps of moving the shutter blade by the actuator in the opening direction, changing over the actuator in response to a reach of the shutter blade to the reference position in the opening direction, and then moving the shutter blade by inertia so as to move to the limit open position.

The limit open position is associated with a smallest value in a tolerable range of the opening diameter for providing exposure optimally.

The reference position is offset in the opening direction from a position which the shutter blade reaches to start opening the exposure opening.

In another preferred embodiment, the reference position is determined a position which the shutter blade reaches to start opening the exposure opening.

Moreover a bias member biases the shutter blade in the closing direction, wherein the shutter blade, when the actuator is turned on, is moved in the opening direction, and when the actuator is turned off, is moved by the inertia to the maximum open position against the bias member, and then is moved by the bias member in the closing direction.

A projection is disposed on the shutter blade, to project laterally with reference to a moving path of the shutter blade. The position detector includes a photo sensor, disposed in a moving path of the projection, for photo-electrically detecting the projection.

The actuator is a solenoid.

The actuator, when operated in a forward direction, moves the shutter blade in the opening direction, and when operated in a reverse direction, moves the shutter blade in the closing direction. Furthermore a speed reducer regulates operation of the actuator, to reduce a moving speed of the shutter blade. A clutch mechanism is displaced in accordance with an operating state of the actuator, for connecting the actuator with the speed reducer when the actuator is operated in the forward direction, and for disconnecting the actuator from the speed reducer when the actuator is operated in the reverse direction.

The actuator is a motor, and the motor, when supplied with a first drive current, is rotated in the forward direction, and when supplied with a second drive current flowing in reverse to the first drive current, allows the inertia to move the shutter blade to the maximum open position, and then is rotated in the reverse direction.

The clutch mechanism includes a projection member, secured to a rotor shaft of the motor, to project radially. A clutch lever is disposed rotatably, and has first and second ends, the first end being connected with the speed reducer, the second end being disposed in a rotational orbit of the projection member, and pushed by the projection member when the motor is rotated in the forward direction.

The actuator is a motor, including a rotor, disposed rotatably, and having first and second magnetic poles directed opposite to each other with respect to a central axis of rotation thereof. A stator has first and second stator arms, which are confronted with each other, and between which the rotor is disposed, the stator being supplied with a first drive current and a second drive current flowing in reverse thereto, for generating magnetic field thereabout, wherein the first stator arm attracts one of the first and second magnetic poles, and the second stator arm attracts a remaining one of the first and second magnetic poles, so as to rotate the rotor in an angular range smaller than one rotation in the forward and reverse directions.

At least one shutter blade is first and second shutter blades. A linking lever is coupled directly with a rotor shaft of the rotor, having first and second ends, the first end being secured to the first shutter blade, the second end being secured to the second shutter blade, wherein when the first shutter blade is slid, the linking lever slides the second shutter blade in a direction reverse to a direction in which the first shutter blade is slid.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS OF THE PRESENT INVENTION

Figure 1:
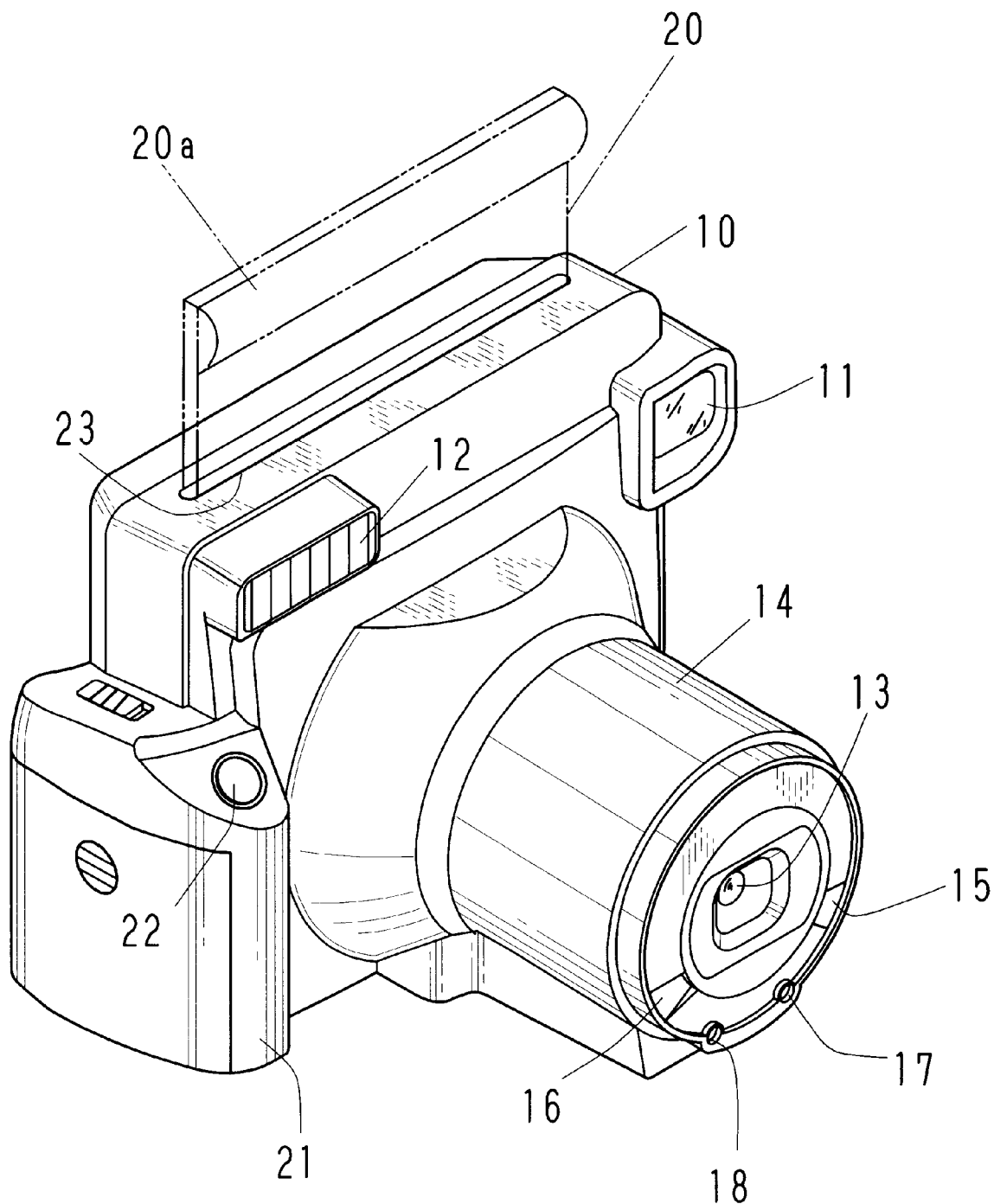
FIG. 1 is a perspective illustrating an instant camera.

In FIG. 1, an instant camera is illustrated, in which a shutter device of the present invention is incorporated. A camera body 10 has a viewfinder 11, a flash emitter 12 and a lens barrel 14, which supports a taking lens 13 therein. The lens barrel 14 incorporates various elements including the shutter device and an advancing mechanism for advancing the taking lens 13 in accordance with the subject distance of a photographic subject. The front of the lens barrel 14 has a light projector window 15 of a rangefinding device, a light receiver window 16 of the rangefinding device, a photometric window 17 and a flash light measuring window 18. The light projector window 15 and the light receiver window 16 cooperate for auto-focussing. The photometric window 17 is used for measuring a subject brightness of the subject. The flash light measuring window 18 is used for measuring the light amount of flash light.

The rear of the camera body 10 has a photo film pack holder chamber (not shown), which is loaded with a photo film pack. The photo film pack contains a stack of a plurality of photo film units 20 of the mono-sheet type. When a shutter release button 22 disposed on a grip 21 is depressed, an exposure is taken on an uppermost one of the photo film units 20. The uppermost photo film unit is exited through an ejector slot 23 of the camera body 10. In the course of exiting, a pair of spreader rollers in the ejector slot 23 squeeze a processing solution pod 20a of the photo film unit, and spread the processing solution on the whole image of the photo film unit. The photo film unit is processed, and comes to have a finished image as a photographic print after a short time.

Figure 2:
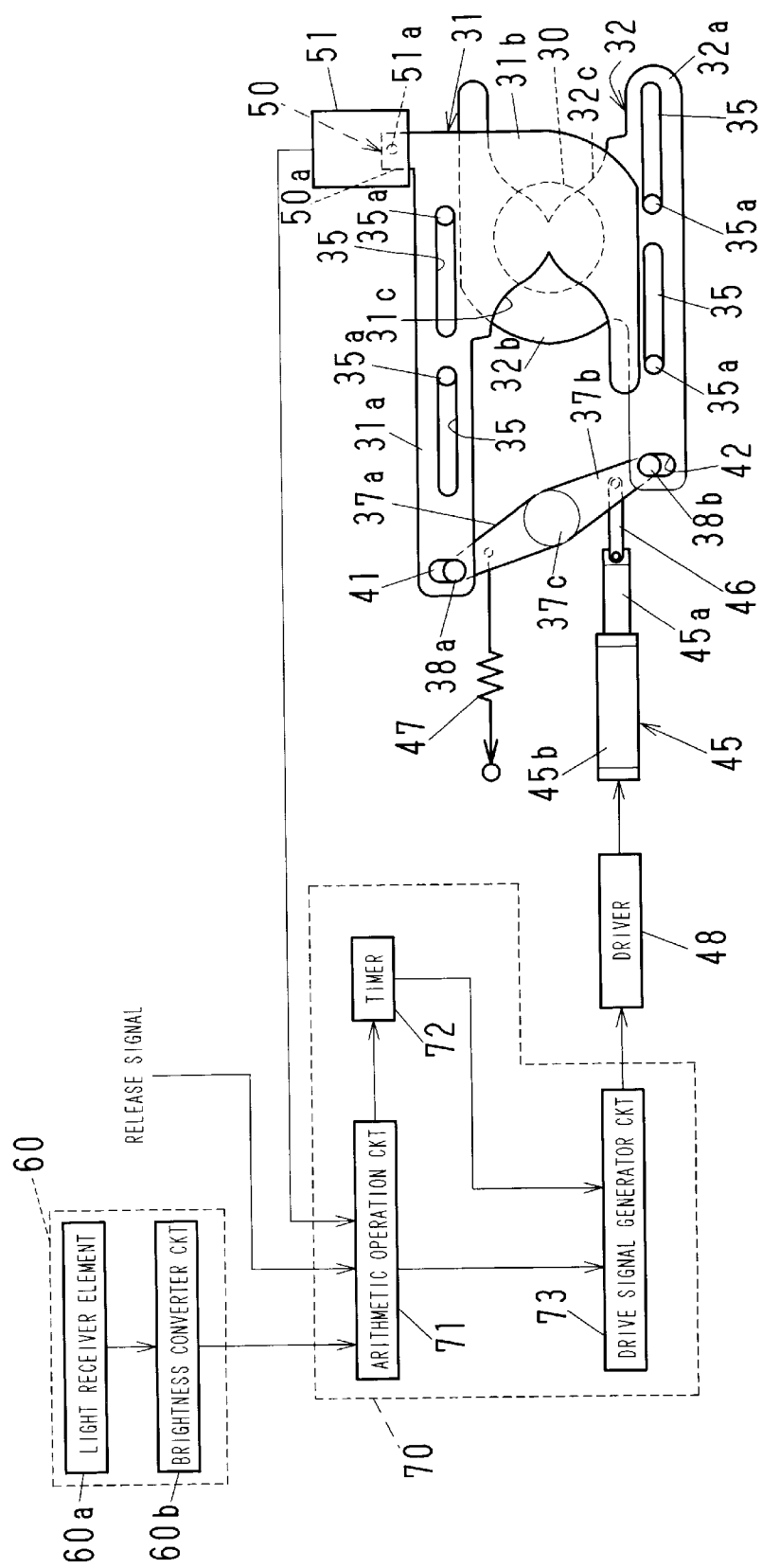
FIG. 2 is an explanatory view in plan and diagram, illustrating a shutter device in the instant camera.

In FIG. 2, the shutter device has a photometric unit 60 and a controller 70. The photometric unit 60 measures the subject brightness. The controller 70 receives information of the subject brightness, and controls operation of an actuator, for the purpose of controlling opening/closing movement of shutter blades.

Behind the taking lens 13 is located an exposure opening 30, which causes photographic light from the taking lens 13 to enter the photo film pack holder chamber. To open and close the exposure opening 30, a pair of shutter blades 31 and 32 are used. The shutter blades 31 and 32 are also used for controlling a light amount. The shutter blade 31 is constituted by a guide portion 31a and a blade portion 31b. The blade portion 31b is moved to overlap on the exposure opening 30, and has a recess 31c, which is V-shaped with curves. Similarly the shutter blade 32 includes a guide portion 32a and a blade portion 32b, in which a recess 32c is formed. The shutter blades 31 and 32 are supported slidably in the horizontal direction in the drawing by plural guide pins 35a, which are inserted in guide slots 35 in the guide portions 31a and 32a.

A linking lever 37 includes two arms 37a and 37b, and is supported pivotally about a shaft 37c. There are connection pins 38a and 38b secured to respective ends of the arms 37a and 37b. The connection pins 38a and 38b are engaged with the inside of connection holes 41 and 42, which are formed in respective ends of the guide portions 31a and 32a, to connect the shutter blades 31 and 32 with the linking lever 37. A solenoid 45 as an actuator has a plunger 45a, which is connected via a connection rod 46 with the arm 37b of the linking lever 37. There is a coil spring 47 of which an end is secured to the arm 37a of the linking lever 37. The coil spring 47 biases the linking lever 37 rotationally in the counterclockwise direction.

The solenoid 45 is driven by a driver 48, which the controller 70 controls. The driver 48, while receiving the drive signal from the controller 70, causes a drive current in a coil element 45b of the solenoid 45. The solenoid 45, in response to the drive current, draws the plunger 45a into the coil 45b, to cause the linking lever 37 to rotate clockwise against the bias of the coil spring 47.

The linking lever 37 being rotated in the clockwise direction, the shutter blades 31 and 32 are moved in an opening direction. The shutter blade 31 is slid in the rightward direction. The shutter blade 32 is slit to the left. The recesses 31c and 32c of the blade portions 31b and 32b are overlapped on one another in front of the exposure opening 30, to open the exposure opening 30. When sliding amounts of the shutter blades 31 and 32 increase, the opening diameter of the area formed by the recesses 31c and 32c increases.

When the drive current is interrupted upon the stop of the drive signal, the force of the coil spring 47 causes the linking lever 37 to rotate counterclockwise and to draw the plunger 45a toward the outside of the coil 45b. The shutter blades 31 and 32 slide in a closing direction reverse to the opening direction. The blade portions 31b and 32b overlap on each other to close the exposure opening 30. In the present embodiment, a shutter-close signal is constituted by the stop of the drive signal. Upon a lapse of certain time after the stop of the drive signal, the shutter blades 31 and 32 start sliding in the closing direction. This delay is due to causes including response of the solenoid 45 and inertia exerted in the linking lever 37 and the shutter blades 31 and 32.

In the present invention, it is intended to avoid omission of taking an exposure due to failure in movement of the shutter blades, and also to enable an exposure control by use of the exposure value even when the exposure value is its maximum. For these purposes, time starts being measured when the shutter blades 31 and 32 come to a preadjusted reference position while slid in the opening direction. When the elapsed time comes equal to a timer time determined to correspond to the exposure value, the drive signal is stopped. When the exposure value is the maximum, the shutter blades 31 and 32 are reliably opened even if the drive signal is stopped at the same time as the shutter blades 31 and 32 come to the reference position.

To detect the reach of the shutter blades 31 and 32 to the reference position, there are a projection 50 and a photo interrupter 51 as a position detector. The projection 50 is formed on the shutter blade 31, and projects from its upper edge in a shape of a rectangular quadrangle. The photo interrupter 51 includes a light receiver and a light projector, between which a path is located for the projection 50 to pass.

Before the shutter blades 31 and 32 start sliding in the opening direction, the projection 50 is located at a detection position 51a defined between the light projector and light receiver of the photo interrupter 51. When the shutter blades 31 and 32 come to the reference position, a left side 50a of the projection 50 becomes located at the detection position 51a. In response to this the photoelectric signal from the photo interrupter 51 changes from the Low (L) level to the High (H) level. This change in the photoelectric signal from the Low (L) level to the High (H) level is a reference position detecting signal which represents a reach of the shutter blades 31 and 32 to the reference position. The reference position detecting signal is sent to the controller 70, and is used for the start of measurement of time, which will elapse upon the stop of generating the drive signal.

The reference position is determined in consideration of the sliding speed of the shutter blades 31 and 32, and their response with which the shutter blades 31 and 32 starts sliding in the closing direction after the stop of the drive signal. The combination of those factors is herein called an "operating characteristic" of the shutter blades 31 and 32. The reference position is so determined that, if the drive signal is stopped upon the reach of the shutter blades 31 and 32 to the reference position, the shutter blades 31 and 32 will form a shutter opening having at least the predetermined lower limit of the opening diameter.

In the course of the opening/closing operation, the opening diameter of the shutter becomes the maximum when the slide of the shutter blades 31 and 32 changes from the opening direction to the closing direction. A term "maximum open position" is used to represent this turning point of the shutter blades 31 and 32. In the present invention, the reference position is adjusted and predetermined in such a manner that the maximum opening diameter in the course of the opening/closing operation is at least the preset lower limit of the opening diameter even when the drive signal is stopped upon the reach of the shutter blades 31 and 32 to the reference position. This is in consideration of the lowest speed of slide of the shutter blades 31 and 32 in a range of deviations in their characteristic operation. A term "limit open position" is used to represent a position where the shutter blades 31 and 32 are located to set the lower limit to the opening diameter. Note that the lower limit of the opening diameter is determined as the smallest of the plural diameter values of the shutter blades 31 and 32, and corresponds to the shortest of the plural preset values of exposure time.

Figure 3:
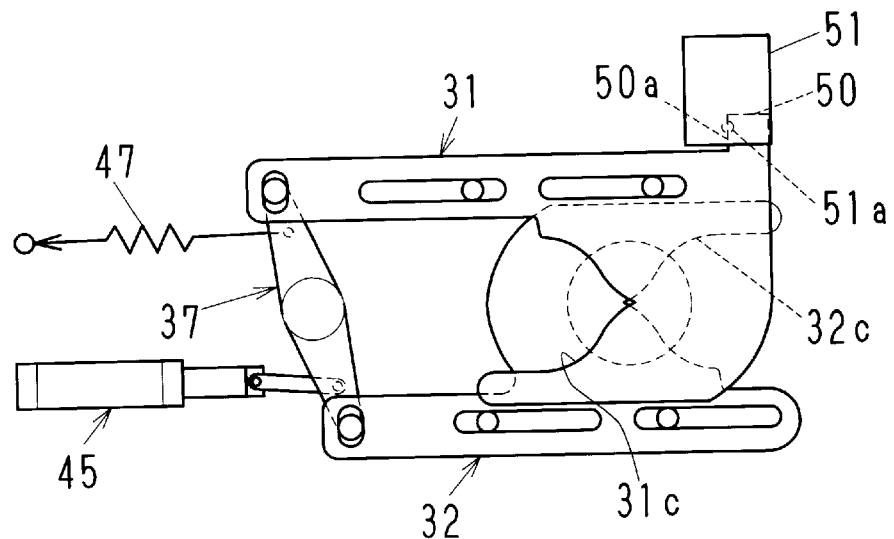
FIG. 3 is an explanatory view in plan, illustrating the shutter device in a state of detecting a reference position.

Deviations in the operating characteristic of the shutter blades 31 and 32 are experimentally obtained in accordance with various items, including a change in the direction of applying gravity to the plunger 45a or to the shutter blades 31 and 32 due to a difference in the orientation of manually holding the instant camera; changes in friction between shutter blades; influences of humidity and temperature in predetermined ranges; changes with time in a predetermined range. Under the condition with all those deviations in the operating characteristic, the reference position is finally determined. For example, the reference position is determined as such where a pinhole of FIG. 3 is initially formed by the recesses 31c and 32c while the shutter blades 31 and 32 are slid in the opening direction. Upon detecting the reference position, the left side 50a of the projection 50 is confronted with the detection position 51a of the photo interrupter 51. Naturally the reference position is differently defined according to a change in the operating characteristic.

Figure 4:
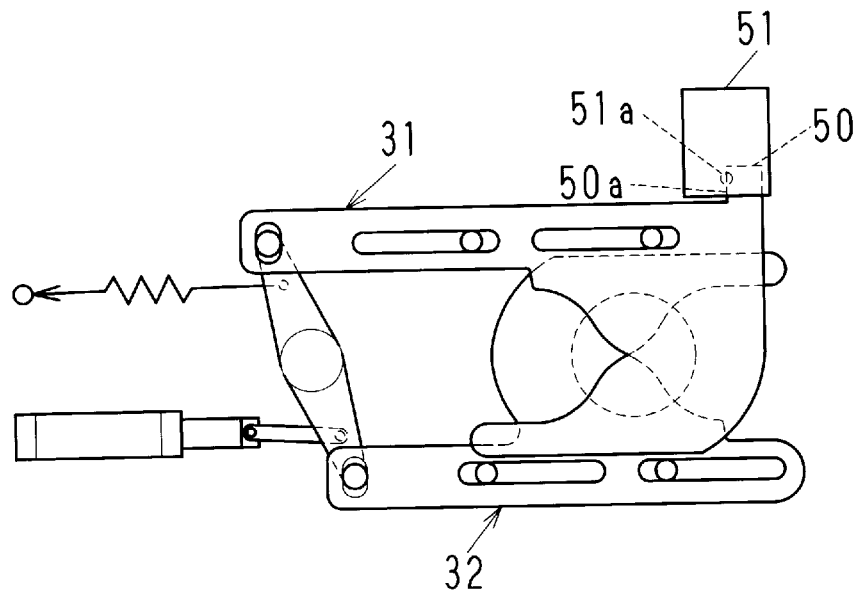
FIG. 4 is an explanatory view in plan, illustrating another preferred embodiment having a reference position defined as a position of starting forming a shutter opening.

Of course the reference position may be determined differently. In FIG. 4, the reference position is determined as a position DO (See FIG. 5) where the shutter blades 31 and 32 start forming an opening between them, by suitably setting the detection position 51a of the photo interrupter 51. This is effective in simply avoiding omission in exposure, without consideration of the size of the opening diameter of the shutter. The drive signal is stopped upon the reach to the reference position. Inertia of the shutter blades 31 and 32, the linking lever 37 and the plunger 45a slides the shutter blades 31 and 32 in the opening direction, to form the opening of the shutter. Furthermore it is possible to determine the reference position as a position in advance of the opening-forming start position D0. It is desirable to determine the reference position equal to or short of the position of forming the lower limit of the opening diameter. This is because the start of sliding in the closing direction only becomes late, and because the exposure amount should not be excessive to the extent of over-exposure.

Note that the position detector for detecting the reach of the shutter blades 31 and 32 to the reference position can be constructed differently from the above for the purpose of the detecting the position or sliding amount of the shutter blades. It is preferable to use a non-contact construction for the detection. In the present embodiment the position of the shutter blade 31 is directly detected. Alternatively a position of a member different from the shutter blades 31 and 32 may be detected for indirect detection of that of the shutter blade 31. For example, a position or shifted amount of the plunger 45a or the linking lever 37 may be detected.

The photometric unit 60 is constituted by a light receiver element 60a and a brightness converter circuit 60b. The light receive relement 60a is disposed behind the photometric window 17, receives subject light from the subject, and sends the brightness converter circuit 60b a photoelectric signal which is proportional to the subject brightness or intensity of the subject light. The brightness converter circuit 60b outputs the subject brightness information LV in accordance with the signal from the light receiver element 60a. The subject brightness information LV is sent to the controller 70.

The controller 70 is constituted by an arithmetic operation circuit 71, a timer 72 and a drive signal generator circuit 73. Each time that the shutter release button 22 is depressed, a release signal is generated by a microcomputer controlling an exposure-taking sequence, and sent to the arithmetic operation circuit 71. In response to the release signal, the arithmetic operation circuit 71 retrieves the subject brightness information LV being input at the same time, and calculates the exposure value EV in accordance with the subject brightness information LV and photo film sensitivity of the photo film unit 20 in the camera. Then the arithmetic operation circuit 71 refers to the conversion table, and obtains timer time T in accordance with the exposure value EV. The arithmetic operation circuit 71 sets the timer time T to the timer 72, and also sends a trigger signal to the drive signal generator circuit 73. The arithmetic operation circuit 71 receives the reference position detecting signal from the photo interrupter 51. Upon the receipt of this, the arithmetic operation circuit 71 sends a measurement start signal to the timer 72.

The arithmetic operation circuit 71 stores a conversion table of the timer time T. The address of the conversion table is stepwise values of the exposure value EV. To obtain the stepwise values, the whole range of the exposure value EV, in which the exposure control is possible in the performance of the shutter device, is divided into them with reference to plural steps. The timer time T starts being measured when the shutter blades 31 and 32 slide to reach the reference position, and finishes being measured when a shutter-close signal is generated, namely when the drive signal is stopped. The timer time T is so determined that a suitable exposure amount is obtained in consideration of the exposure value EV in the course of the shutter opening/closing operation. For the maximized exposure value EV, the timer time T is determined as zero (0) for the purpose of taking an exposure with the preset lowest opening diameter. The timer time T increases according to a decrease of the exposure value EV. Note that, if the measured exposure value EV is over the preset maximum, the timer time T=0 still corresponding to the preset maximum is used.

There occur irregularities in the operation of the shutter blades 31 and 32 varied from the obtained operating characteristic of the shutter blades 31 and 32. Such irregularities cannot be completely overcome no matter how the timer time T in the conversion table is determined in association with the exposure value EV. Accordingly it is preferable that the timer time T different from zero (0) is predetermined in consideration of frequently occurring ones of the irregularities in the operation of the shutter blades 31 and 32, so as to optimize the exposure amount in a greater number of exposures. Also it is preferable the timer time T is predetermined in consideration of a mean value in a range of irregularities in the operation of the shutter blades 31 and 32, so as to regularize the exposure amount in a preferable range defined to include the optimized exposure amount.

The timer 72 starts measuring elapsed time when receiving the measurement start signal from the arithmetic operation circuit 71, and generates a stop signal when the measured elapsed time comes up to the timer time T being set. The stop signal is sent to the drive signal generator circuit 73. If the timer time T=0 is set, the timer 72 generates the stop signal upon the setting of the timer time T. The drive signal generator circuit 73, when receiving the trigger signal from the arithmetic operation circuit 71, generates the drive signal, and when receiving the stop signal from the timer 72, stops generating the drive signal. In short, the drive signal generator circuit 73 generates the drive signal only during a term starting upon the reach of the shutter blades 31 and 32 to the reference position and finishing upon the lapse of the timer time T. The drive signal is sent to the driver 48.

In short, the drive signal is stopped upon the finish of the time measurement after the reach of the shutter blades 31 and 32 to the reference position. This is effective in preventing the opening diameter of the shutter opening of the shutter blades 31 and 32 from being influenced by irregularities in the start of the shutter blades 31 and 32 in the opening direction, and irregularities in the sliding speed of the shutter blades 31 and 32 in the starting step of the slide.

Figure 5:
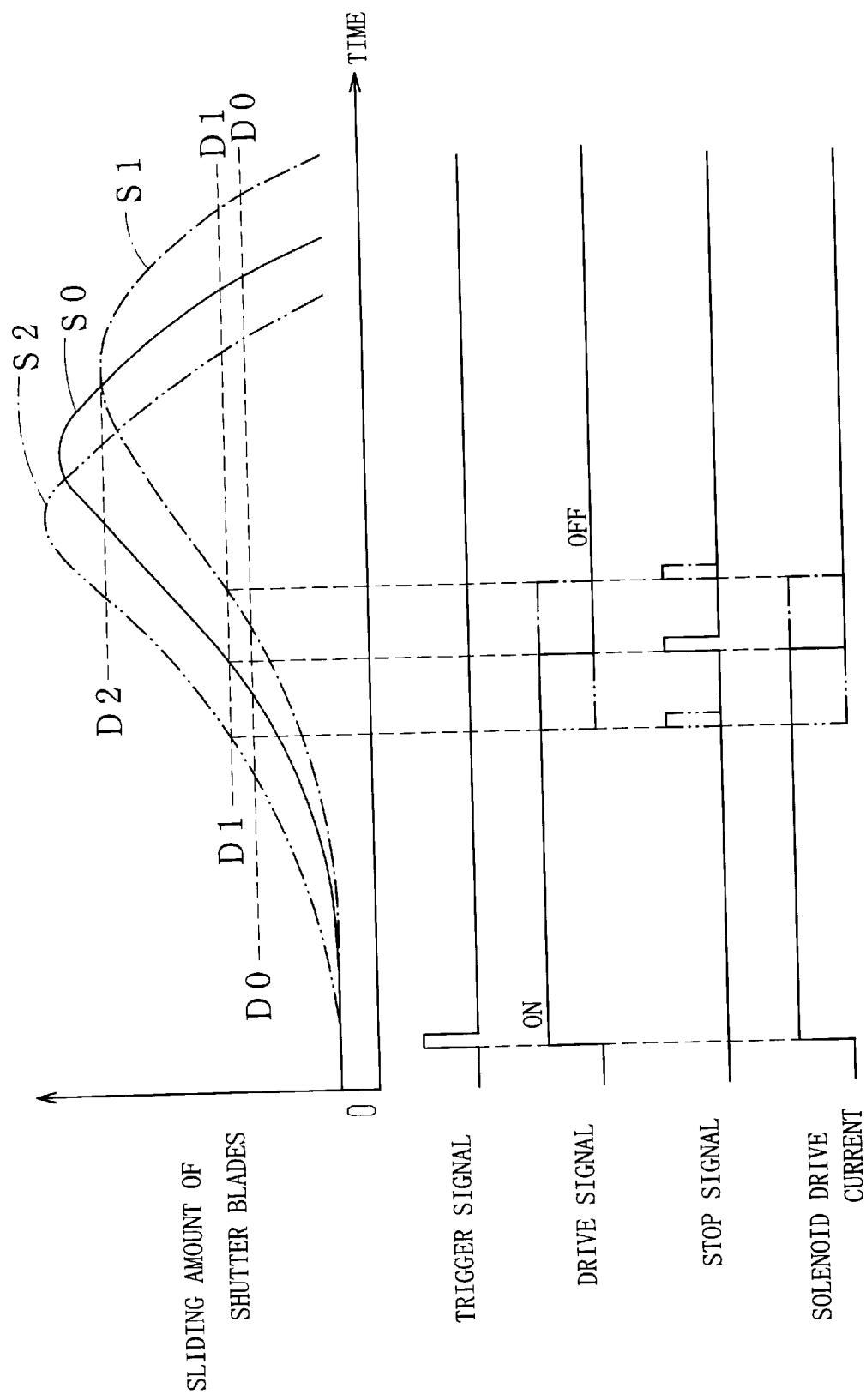
FIG. 5 is a graph illustrating operation of the shutter device.

The operation of the above construction is now described. In FIG. 5, S0 designates a characteristic curve of standard operation of the shutter blades 31 and 32 which start sliding with designed quickness of response, and slide at designed sliding speed. S1 and S2 designate characteristic curves of the shutter blades 31 and 32 which operate with extreme deviations in an expected range of operation. The curves S1 and S2 are considered in determining the reference position. The curve S1 indicates that there is lower quickness of the response in the start of sliding, and the sliding speed is lower, both than the standard characteristic curve. The curve S2 indicates that there is higher quickness of the response in the start of sliding, and the sliding speed is higher, both than the standard characteristic curve.

The photo film pack being loaded, the user aims at a photographic subject, and depresses the shutter release button 22 to take an exposure. The photometric unit 60 receives the subject light, and sends the subject brightness information LV to the arithmetic operation circuit 71 according to the intensity of the subject light. Upon the depression of the shutter release button 22, the microcomputer sends the release signal to the arithmetic operation circuit 71.

Upon the release signal, the arithmetic operation circuit 71 fetches the subject brightness information LV from the photometric unit 60, and calculates the exposure value EV from the subject brightness information LV and photo film sensitivity of the photo film unit 20. The arithmetic operation circuit 71 refers to the conversion table, and converts the exposure value EV to the timer time T. If the subject brightness is high and the exposure value EV is determined the maximum, then the exposure value is converted to the timer time T=0, which is set in the timer 72. Then the arithmetic operation circuit 71 sends the trigger signal to the drive signal generator circuit 73.

The drive signal generator circuit 73, upon the receipt of the trigger signal, starts generating the drive signal (on-state). The driver 48 causes a drive current to flow in the solenoid 45. The plunger 45a is drawn into the coil 45b, to rotate the linking lever 37 clockwise in FIG. 2 against the bias of the coil spring 47. Then the shutter blades 31 and 32 are slid in the opening direction by the arms 37a and 37b.

When the plunger 45a is drawn inwards to a greater extent to rotate the linking lever 37 at a greater angle, the sliding amount of the shutter blades 31 and 32 in the opening direction is increased. When the shutter blades 31 and 32 come to the position D0, the recesses 31c and 32c of the shutter blades 31 and 32 initially come to one another. Afterwards the shutter blades 31 and 32 come to the reference position D1 of FIG. 5. See FIG. 3. The left side 50a of the projection 50 is confronted with the detection position 51a of the photo interrupter 51, which sends the arithmetic operation circuit 71 the reference position detecting signal.

Upon the reference position detecting signal, the arithmetic operation circuit 71 sends the measurement start signal to the timer 72. The timer 72 starts measuring time. In this case the timer time T=0 is set. Thus upon the receipt of the measurement start signal, the timer 72 sends the stop signal to the drive signal generator circuit 73. This is at the same time as the reference position detecting signal. In response to this the drive signal generator circuit 73 stops generating the drive signal (off-state). The drive current from the driver 48 to the solenoid 45 is interrupted.

Now the solenoid 45, when de-energized, does not apply force to the linking lever 37 in the clockwise rotational direction. The coil spring 47 in turn applies force to the linking lever 37 in the counterclockwise direction. But the linking lever 37 does not start rotating counterclockwise, because inertia in the clockwise direction operates in a short section by cooperation of the linking lever 37, the plunger 45a and the shutter blades 31 and 32. The shutter blades 31 and 32 do not start moving in the closing direction immediately upon the interruption of the drive current. When a short time elapses after the interruption of the drive current, then the linking lever 37 is caused by the coil spring 47 to rotate in the counterclockwise direction. The shutter blades 31 and 32 start sliding in the closing direction. Also the plunger 45a is drawn toward the outside of the coil 45b by the rotation of the linking lever 37.

Figure 6:
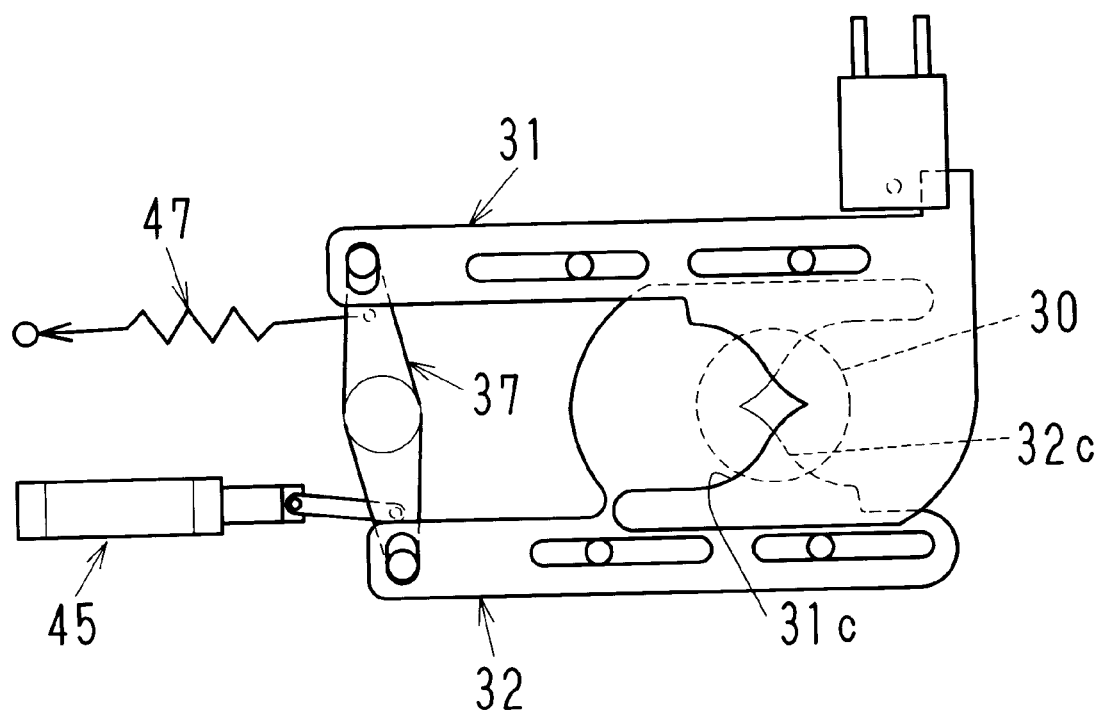
FIG. 6 is an explanatory view in plan, illustrating the shutter device in a state of forming a lower limit of the opening diameter.

Then the shutter blades 31 and 32 form the shutter opening of the maximum opening diameter in the opening/closing sequence in front of the exposure opening 30 upon the change in the sliding direction from the opening direction to the closing direction. The reference position is so preadjusted that the maximum opening diameter in the opening/closing sequence is at least the lower limit of the opening diameter characteristically defined for the shutter. The shutter blades 31 and 32 operate within their irregularity range of the operating characteristic considered in preadjusting the reference position. The shutter blades 31 and 32 come to the limit open position D2 illustrated in FIG. 5 with the curve S1 for forming the shutter opening of the lower limit of the opening diameter, before being slid in the closing direction. In the cases of the curves S0 and S2, the shutter blades 31 and 32 come to the limit open position D2, and are further slid in the opening direction before being slid in the closing direction. In FIG. 6, the shutter opening with the lower limit of the opening diameter is illustrated, in front of the exposure opening 30.

After this the shutter blades 31 and 32 slide in the closing direction to decrease the opening diameter of the shutter opening. When the shutter blades 31 and 32 slide past the position D0, the exposure opening 30 is closed completely by the shutter blades 31 and 32.

The shutter blades 31 and 32 open and close. While the shutter blades 31 and 32 form the shutter opening, the subject light entered through it passes the exposure opening 30 to expose the photo film unit 20. After the finish of the exposure, the photo film unit 20 is exited from the instant camera. In the exiting operation, the solution pod 20a of the photo film unit 20 is pushed open. The processing solution from the solution pod 20a processes the exposed image, to obtain a photographic print after a short time. As the shutter blades 31 and 32 have formed a shutter opening of at least the opening diameter of the lower limit, there does not occur absence of an image due to an omission of the opening/closing operation of the shutter device.

No matter how small the timer time T, the opening diameter of the shutter opening is kept in a range equal to or more than the predetermined lower limit. Consequently it is unnecessary to reduce the preset upper limit of the exposure value EV to a value lower than the maximum exposure value EV at which the shutter blades 31 and 32 can take an exposure characteristically. It is possible in the present invention to effect control of an exposure in the high brightness range of the subject.

If the exposure value EV is over the upper limit, the timer time T=0 is used for opening/closing the shutter blades 31 and 32 in a similar manner to the exposure value EV being the upper limit. In such cases the photo film unit will be the more over-exposed according to the highness of the subject brightness. If the exposure value EV is lower than the upper limit, then the timer time T>0 associated with the exposure value EV is set in the timer 72 before the drive signal is generated. The shutter blades 31 and 32 are slid in the opening direction. After the shutter blades 31 and 32 are slid to the reference position, the timer time T being set lapses. In response to this the drive signal is stopped. Upon a lapse of time after the stop of the drive signal, the shutter blades 31 and 32 are slid in the closing direction. Then the shutter blades 31 and 32 operate to provide an exposure for the photo film unit 20 with an exposure time and opening diameter corresponding to the exposure value EV.

Figure 7:
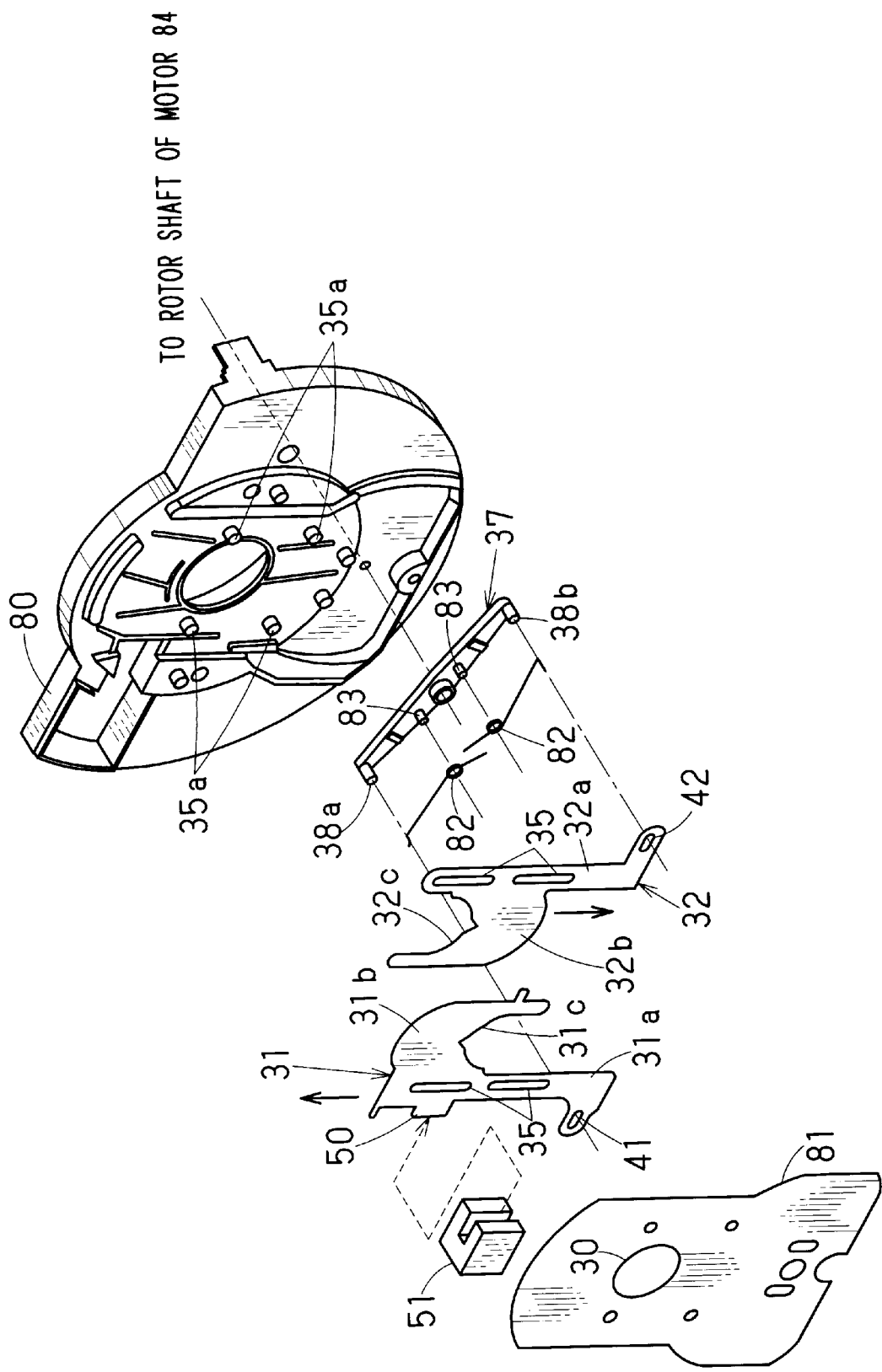
FIG. 7 is an exploded perspective illustrating the shutter blades and their relevant mechanism according to still another preferred embodiment.
Figure 8:
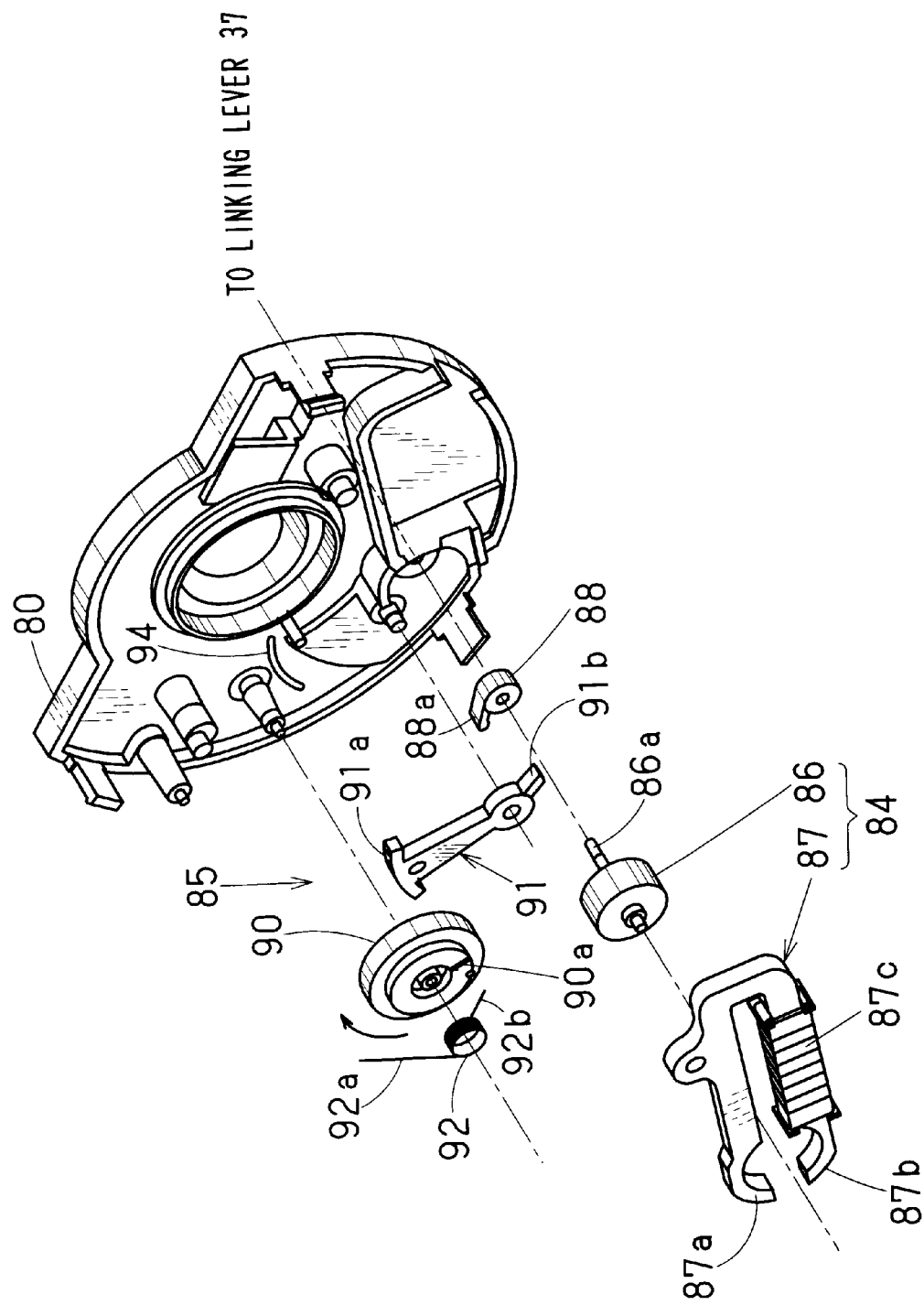
FIG. 8 is an exploded perspective illustrating a motor and its relevant mechanism of the same embodiment.

In FIGS. 7 and 8, another preferred embodiment is illustrated, in which a motor is used to drive the shutter blades directly. Elements similar to those of the above embodiment are designated with identical reference numerals.

In FIG. 7, there is a shutter base plate 80 on which the guide pins 35*a* and other elements are formed. A mask plate 81 having the exposure opening 30 is mounted on the rear of the shutter base plate 80, together with the shutter blades 31 and 32, the linking lever 37 and the photo interrupter 51. The shutter blades 31 and 32, when the linking lever 37 rotates, are slid in the opening direction indicated by the arrow direction, and in the closing direction reverse to it.

Each of torsion coil springs 82 has the central coiled portion supported by receiving insertion of one of pins 83. The pins 83 are formed on the linking lever 37. One end of the torsion coil springs 82 is fitted on the shaft 37*c*. The remaining end of the torsion coil springs 82 is secured to each of the connection holes 41 and 42 in the shutter blades 31 and 32. The torsion coil springs 82 bias the shutter blades 31 and 32 to press the inside of the connection holes 41 and 42 against the connection pins 38*a* and 38*b,* for the purpose of connecting the shutter blades 31 and 32 with the linking lever 37 without excessive play.

In FIG. 8, there are a motor 84 and a speed reducer 85 assembled on the front of the shutter base plate 80. The motor 84 is an actuator which opens and closes the shutter blades 31 and 32. The motor 84 is a moving magnet type, and is constituted by a rotor 86 and a stator 87. The rotor 86 consists of permanent magnet. The stator 87 includes a pair of stator arms 87*a* and 87*b*.

The rotor 86 has a rotor shaft 86*a,* which is fixedly secured to the shaft 37*c* of the linking lever 37 through a rear hole in the shutter base plate 80. Also a projection member 88 is secured to the rotor shaft 86*a*. The projection member 88 is included in a clutch mechanism associated with the speed reducer 85. The stator 87 has a winding 87*c* wound about its core. When a drive current flows in the winding 87*c,* the rotor 86 makes rotation by a predetermined angle.

Figure 9A:
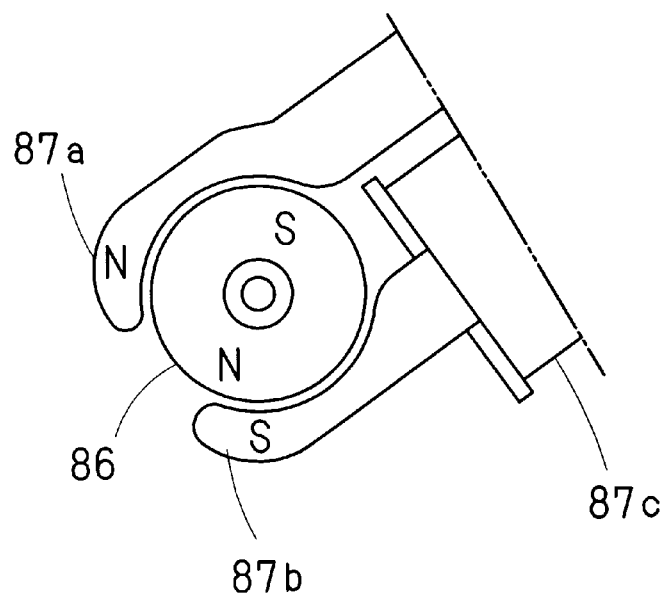
FIG. 9A is an explanatory view illustrating a rotor and a stator of the motor.
Figure 9B:
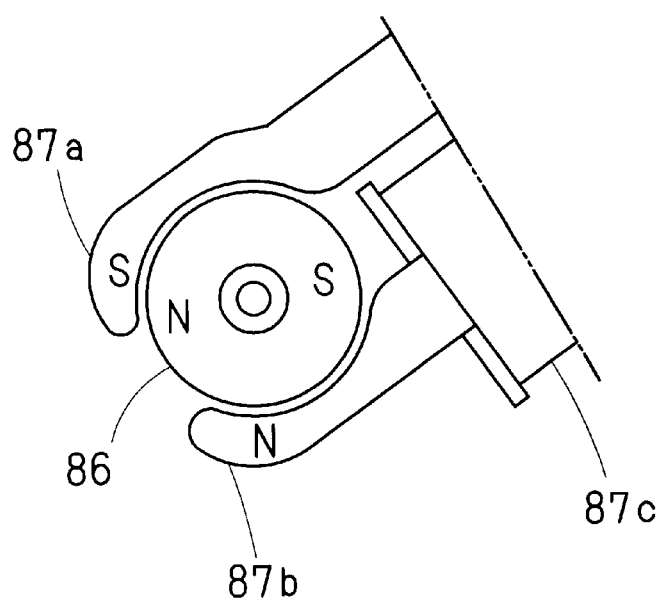
FIG. 9B is an explanatory view illustrating the same as FIG. 9A but in which the rotor has a different position.

When the drive current is supplied for the winding 87*c* to apply positive voltage to one terminal of the winding 87*c,* then the stator arm 87*a* becomes the N pole. The stator arm 87*b* becomes the S pole. See FIG. 9A. The S pole of the rotor 86 rotates to a full open position where attracted by the stator arm 87*a*. When a drive current in a direction reverse to the initial one is supplied for the winding 87*c,* then the magnetic poles of the stator arms 87*a* and 87*b* are inverted. See FIG. 9B. The rotor 86 rotates clockwise in FIGS. 9A and 9B from the full open position to a closed position, where the N pole of the rotor 86 is attracted by the stator arm 87*a*.

When the rotor 86 is in the closed position, the exposure opening 30 is closed by the shutter blades 31 and 32 in cooperation with the rotor shaft 86*a* and the linking lever 37. When the rotor 86 is rotated from the closed position toward the full open position, the shutter blades 31 and 32 are slid in the opening direction. When the rotor 86 comes to the full open position, the exposure opening 30 opens fully.

Since the motor 84 is directly coupled with the linking lever 37 to drive the shutter blades 31 and 32, the drive mechanism for opening/closing the shutter blades 31 and 32 is simplified. This drive mechanism has a small number of component parts. Inertia of those component parts associated with the motor 84 can be reduced. Response upon the change in the sliding direction of the shutter blades 31 and 32 can be quickened.

In FIG. 8, the front of the shutter base plate 80 supports a flywheel 90 and a clutch lever 91 of the clutch mechanism. The flywheel 90 has a considerably great mass, or weight. There is a torsion coil spring 92 secured to the flywheel 90. A first end 92*a* of the torsion coil spring 92 is fitted on a pin of the shutter base plate 80. A second end 92*b* of the torsion coil spring 92 is fitted in a cut 90*a* formed in the front face of the flywheel 90. The torsion coil spring 92 rotationally biases the flywheel 90 clockwise, as indicated by the arrow. A gear 93 is formed with the rear of the flywheel 90 on the side of the shutter base plate. See FIG. 10.

One lever end of the clutch lever 91 has a sector gear 91*a* meshed with the gear 93 of the flywheel 90. A remaining lever end 91*b* of the clutch lever 91 is engageable with the projection member 88, and constitutes the clutch mechanism. A pin 91*c* is formed on the rear of the clutch lever 91. See FIG. 10. The pin 91*c* is inserted in a guide groove 94, which is formed in the shutter base plate 80 in an arc shape. The clutch lever 91 is pivotally movable in a range limited by the guide groove 94 to keep the sector gear 91*a* in mesh with the gear 93.

Figure 10:
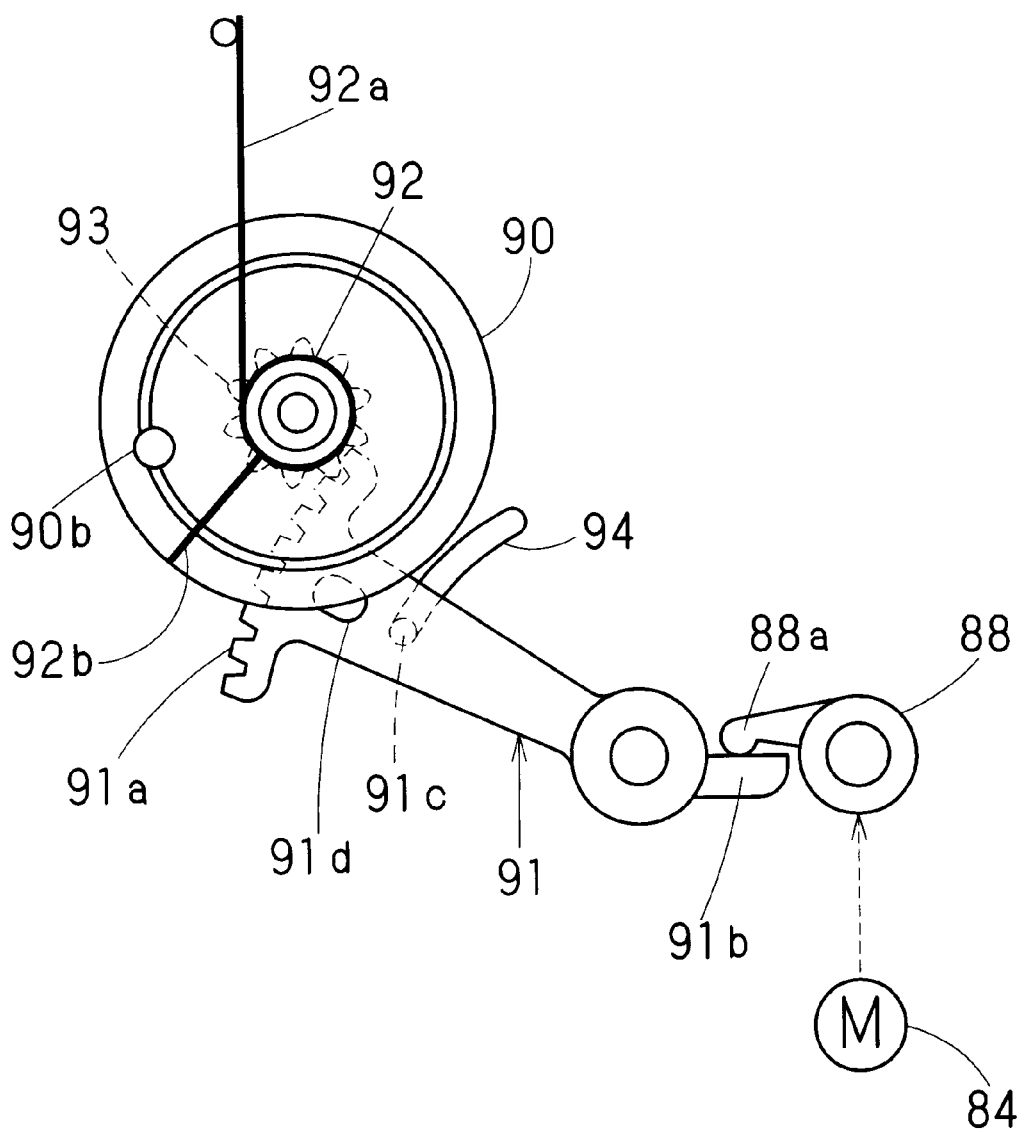
FIG. 10 is an explanatory view in plan, illustrating a relationship between the rotor and a speed reducer.

FIG. 10 illustrates a relationship of the flywheel 90, the clutch lever 91 and the projection member 88 at the time that the rotor 86 of the motor 84 is in the closed position. As the sector gear 91*a* of the clutch lever 91 is meshed with the gear 93 of the flywheel 90, the clutch lever 91 is biased clockwise by the cooperation of the torsion coil spring 92 and the gear 93. The rotor 86 being in the closed position, the lever end 91*b* of the clutch lever 91 is in an initial position and contacts a clutch projection 88*a* of the projection member 88. A pivotally movable range of the clutch lever 91 is limited by the guide groove 94. Thus the clutch lever 91 does not cause the projection member 88 with the rotor 86 being in the closed position.

Figure 11:
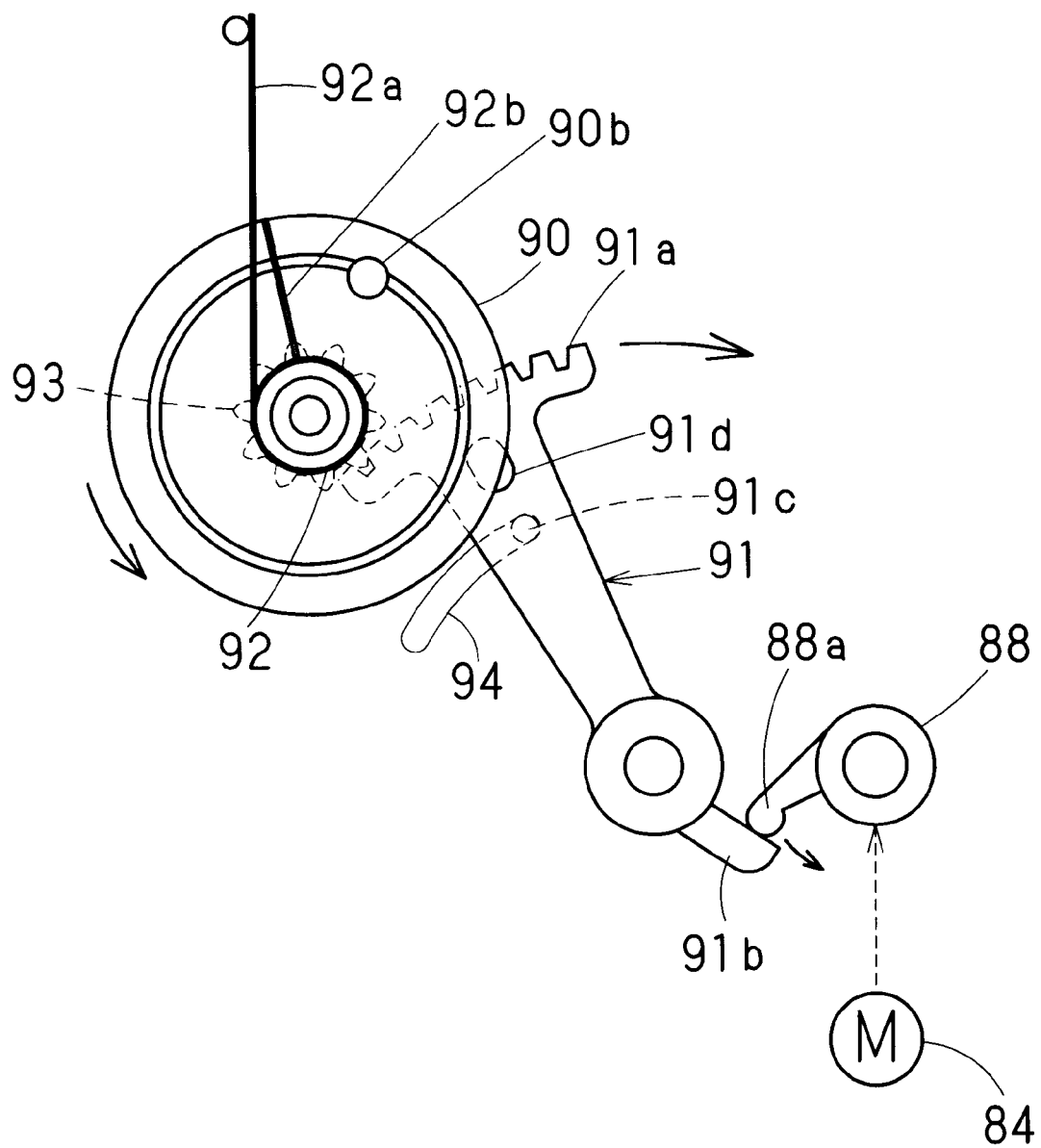
FIG. 11 is an explanatory view in plan, illustrating the rotor and the speed reducer at the time that the shutter blades have come to their maximum open position.

The projection member 88 is rotated counterclockwise when the rotor shaft 86*a* of the motor 84 rotates to slide the shutter blades 31 and 32 in the opening direction. The clutch projection 88a of the projection member 88 pushes the lever end 91b to swing the clutch lever 91 clockwise. As depicted in FIG. 11, the clutch lever 91 comes to a rotational position associated to a position of the shutter blades 31 and 32 to open the exposure opening 30 fully. The direction of this swing of the clutch lever 91 is against that of the bias force of the torsion coil spring 92 exerted via the flywheel 90 to the clutch lever 91.

The flywheel 90 has the great mass and thus provides the great inertia. The projection member 88 is rotated while the flywheel 90 is rotated against the bias of the torsion coil spring 92. Accordingly the rotor 86 rotates slower toward the full open position to slide the shutter blades 31 and 32 in the opening direction than when the motor 84 rotates as disconnected from the flywheel 90.

Figure 12:
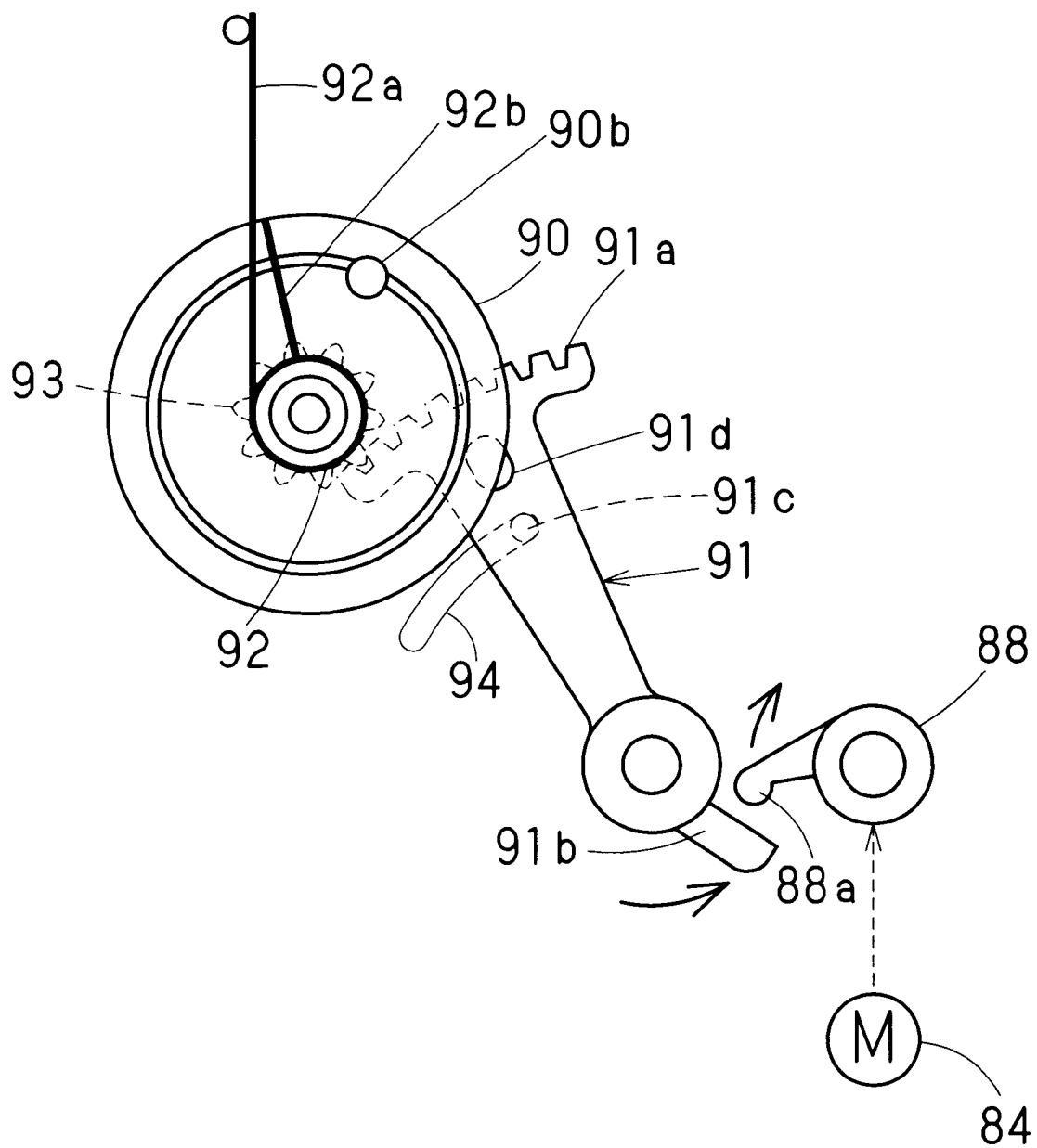
FIG. 12 as an explanatory view in plan, illustrating the rotor and the speed reducer at the time that the shutter blades starts sliding back from their maximum open position.

When the rotor 86 is changed over to the direction toward the closed position, the projection member 88 rotates in a direction of moving the clutch projection 88a away from the lever end 91b of the clutch lever 91. Although the flywheel 90 is biased by the torsion coil spring 92, the inertia of the flywheel 90 causes a delay of a start of rotation which would be caused by the torsion coil spring 92. The clutch lever 91 does not immediately start swinging toward its initial position. In FIG. 12, the motor 84 causes the shutter blades 31 and 32 to slide in the closing direction when the lever end 91b is disengaged from the clutch projection 88a.

The speed in sliding the shutter blades 31 and 32 in the opening direction is set lower. The inertia with the shutter blades 31 and 32 is the smaller. Thus their response becomes higher upon the change in the slide from the opening direction to the closing direction. Let the reference position being determined in consideration of obtaining the lower limit of the opening diameter associated with the upper limit of the exposure value EV in its controllable range, in compliance with such an operating characteristic of the shutter blades 31 and 32 that the start of the operation has a delay and the sliding speed is lower. It is still possible in the present embodiment to reduce the irregularities in the exposure amount even in a case of better operating characteristic.

Note that the shutter blades 31 and 32 can have quick response at the time of the start of the slide in the closing direction. This is because the lever end 91b is disengaged from the projection member 88, to remove influence of the inertia of the flywheel 90 or the bias of the torsion coil spring 92. Then the clutch lever 91 is returned to its initial position slightly after the start of the rotation of the projection member 88, because the torsion coil spring 92 causes the flywheel 90 to rotate.

The bias force of the torsion coil spring 92 changes in accordance with an angle of rotation of the flywheel 90. There are a hole 90b in the flywheel 90 and a hole 91d in the clutch lever 91. In the course of assembly, the flywheel 90 and the clutch lever 91 are mounted by positioning the hole 90b at the hole 91d. This makes it possible for the torsion coil spring 92 to apply suitable force to the motor 84, so as to set the sliding speed of the shutter blades 31 and 32 appropriately during the slide in the opening direction.

Figure 13:
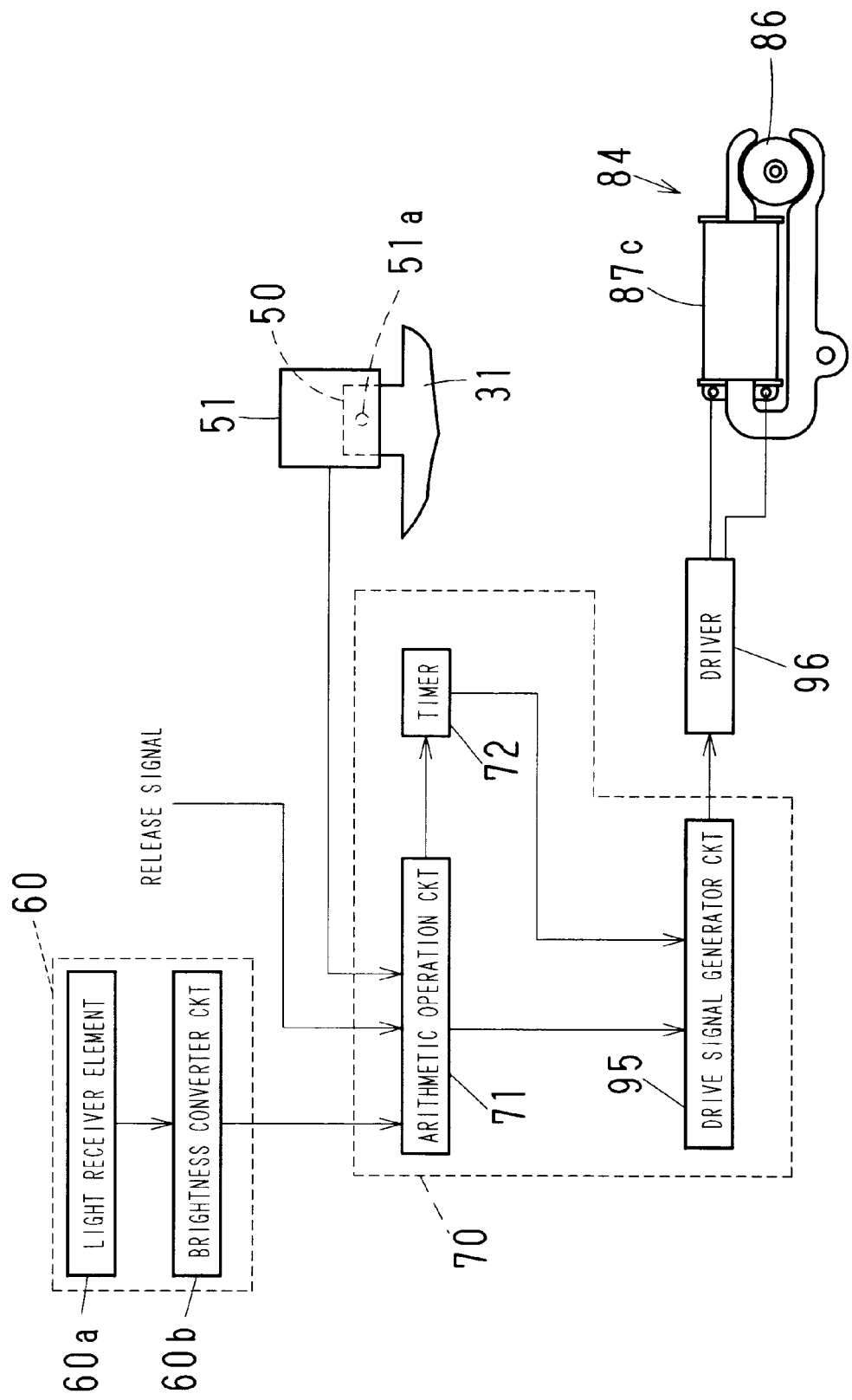
FIG. 13 is a block diagram illustrating the shutter device.

In FIG. 13, the motor 84 is driven by a driver 96, which is controlled upon the drive signal generated by a drive signal generator circuit 95 in the controller 70. The drive signal generator circuit 95 generates the drive signal of two kinds including the High (H) level and the Low (L) level. The drive signal generator circuit 95 generates the drive signal of the High (H) level in a period beginning upon the trigger signal from the arithmetic operation circuit 71 and ending upon the stop signal of the timer 72. When the stop signal is sent to the drive signal generator circuit 95, the drive signal generator circuit 95 generates the drive signal of the Low (L) level for a predetermined time, and then stops the drive signal. To stop the drive signal, an output terminal of the drive signal generator circuit 95 for the drive signal is turned to a state of high impedance.

The driver 96, while supplied with the drive signal of the High (H) level, supplies the winding 87c with the drive current in a direction for the rotor 86 of the motor 84 to rotate toward the full open position. The driver 96, while supplied with the drive signal of the Low (L) level, supplies the winding 87c with the drive current in a direction for the rotor 86 to rotate toward the closed position.

The reach of the shutter blades 31 and 32 to the reference position is detected upon passage of the projection 50 of the shutter blade 31 at the detection position 51a of the photo interrupter 51. This is the same as the first embodiment. Furthermore the response of the shutter blades 31 and 32 upon the changeover to the closing direction is quickened. The range of the projection 50 in the sliding direction can be adjusted differently. The projection 50 is caused to pass the detection position 51a of the photo interrupter 51 when the shutter blades 31 and 32 come to one position in the vicinity of the limit open position associated with the lower limit of the suitable opening diameter.

The reference position is so preadjusted that, upon the reach of the shutter blades 31 and 32 to the reference position, the drive signal is changed to the Low (L) level, and then that the lower limit of the opening diameter of the shutter opening will be formed by the shutter blades 31 and 32. See the description of the first embodiment. But the reference position in the present embodiment is nearer to the limit open position associated with the limit opening diameter than the first embodiment, in which the shutter blades 31 and 32 slide at higher speed in the opening direction.

Figure 14:
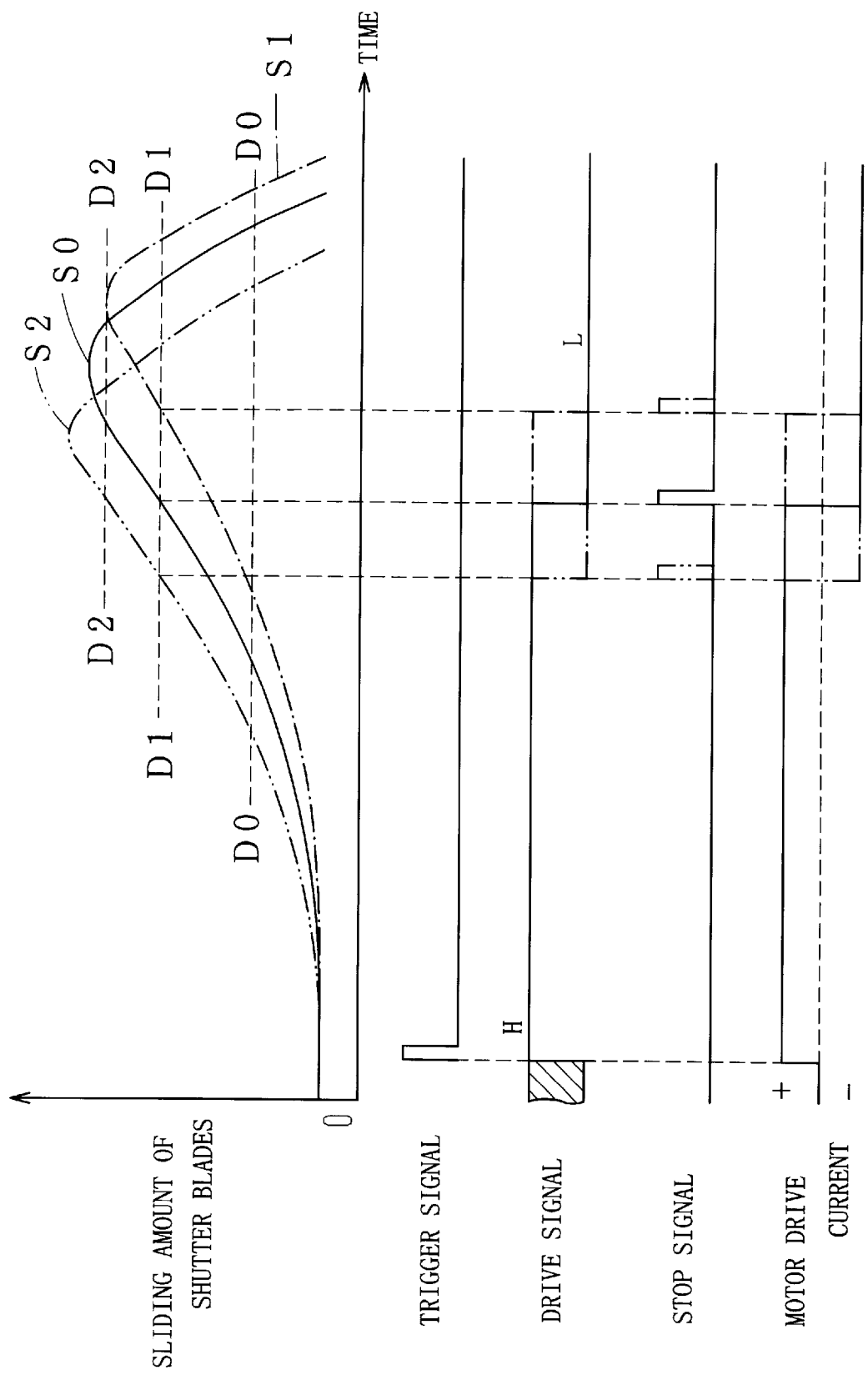
FIG. 14 is a graph illustrating operation of the shutter device.
Figure 15:
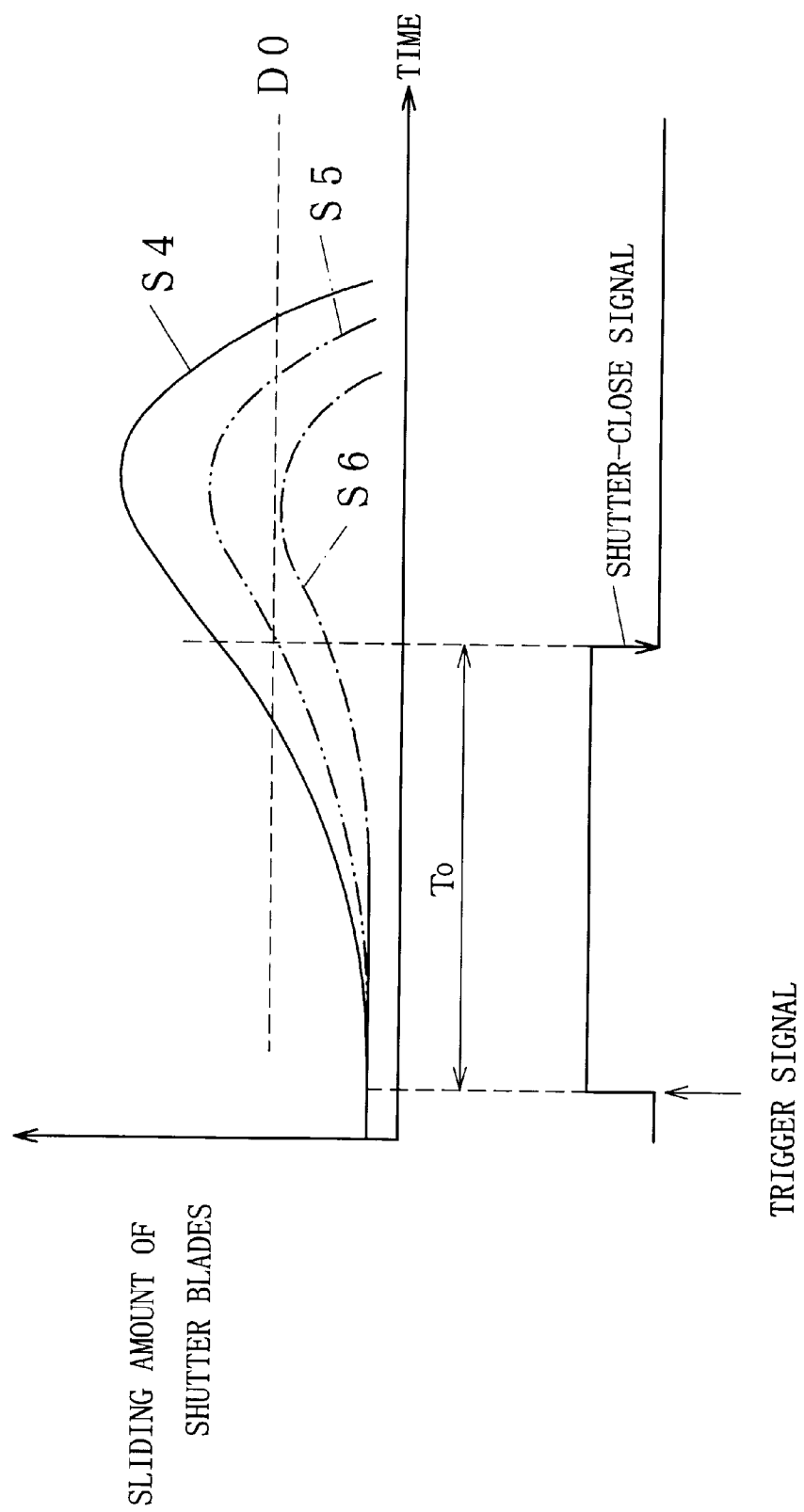
FIG. 15 is a graph illustrating operation of a shutter device of the prior art.

The operation of the present embodiment is described with reference to FIG. 14. S0, S1 and S2 for the curves in FIG. 14 are similar those in FIG. 5. Of course D0, D1 and D2 respectively designate a position of starting the shutter opening between the recesses 31c and 32c, the reference position, and the limit open position for the lower limit of the suitable opening diameter. See FIG. 5.

Upon the receipt of the release signal, the arithmetic operation circuit 71 retrieves the subject brightness information LV from the photometric unit 60, and calculates the exposure value EV in accordance with the subject brightness information LV and photo film sensitivity of the photo film unit 20. Then the exposure value EV is converted into the timer time T. For the upper limit of the exposure value EV, the converted timer time T is zero (0). The timer time T is set in the timer 72. Then the arithmetic operation circuit 71 sends the trigger signal to the drive signal generator circuit 95.

The drive signal of the High (H) level is output by the drive signal generator circuit 73 upon the receipt of the trigger signal. Then the driver 96 supplies the winding 87c of the motor 84 with the drive current. Thus the rotor 86 of the motor 84 starts rotating toward the full open position.

The rotor shaft 86a of the rotor 86 starts rotating. The projection member 88 pushes the lever end 91b of the clutch lever 91 in a firm contact with the lever end 91b. The projection member 88 rotates to swing the clutch lever 91. As the sector gear 91a is meshed with the gear 93, the clutch lever 91 rotates the flywheel 90 against the bias of the torsion coil spring 92. Both the bias force of the torsion coil spring 92 and the great inertia of the flywheel 90 operate as load applied to the rotor shaft 86a. The rotor shaft 86a, therefore, rotates at a reduced speed.

Rotation of the rotor shaft 86a is transmitted to the linking lever 37, which starts rotation clockwise in FIG. 7. The shutter blades 31 and 32 respectively slide in the opening direction. Since the speed of the rotation of the rotor shaft 86a is reduced by the speed reducer 85, the shutter blades 31 and 32 slide at the reduced speed.

The rotational angle of the linking lever 37 increases with an increase in the rotating amount of the rotor 86. The sliding amount of the shutter blades 31 and 32 in the opening direction also increases. When the shutter blades 31 and 32 are slid to the position D0, the recesses 31c and 32c start being overlapped on each other. When the shutter blades 31 and 32 are slid to the reference position D1 short of the position D2, then the photo interrupter 51 sends the reference position detecting signal to the arithmetic operation circuit 71.

The arithmetic operation circuit 71, when receiving the reference position detecting signal, sends the measurement start signal to the timer 72, which starts measuring time. As the timer time T=0 is set, the stop signal is generated immediately upon the receipt of the measurement start signal. The stop signal is sent to the drive signal generator circuit 95. Then the drive signal generator circuit 95 sets the drive signal at the Low (L) level.

Upon the change of the drive signal to the Low (L) level, the driver 96 changes over the direction of the drive current to rotate the rotor 86 in the direction in reverse to the initial one. The clutch projection 88a of the projection member 88 is ready to rotate without engagement with the lever end 91b of the clutch lever 91 when the rotor 86 rotates to the closed position. The inertia of the flywheel 90 does not influence rotation of the rotor shaft 86a. Thus the shutter blades 31 and 32 start sliding in the closing direction with a delay due to various causes including their inertia, that of the linking lever 37 or the rotor 86 and response of the motor 84. Note that this delay is smaller in the present embodiment than in the first embodiment, because the sliding speed of the shutter blades 31 and 32 in the opening direction is set smaller than that according to the first embodiment.

The shutter blades 31 and 32 are in the maximum open position at the time of change of the slide from the opening direction to the closing direction, to maximize the opening diameter in the course of this opening/closing sequence. Then the shutter blades 31 and 32 slide in the closing direction to close the exposure opening 30 finally.

Of course the reference position is so preadjusted that the maximum opening diameter during the opening/closing sequence is at least the lower limit of the suitable opening diameter. When the exposure value EV is the highest in its range, the shutter blades 31 and 32 operate in the manner of the curve S1 of FIG. 14. The shutter blades 31 and 32 come to the position D2 for defining the lower limit of the opening diameter, and at the same time, start sliding in the closing direction to close the exposure opening 30.

If the shutter blades 31 and 32 operate to follow the curve S0 or S1, the shutter blades 31 and 32 come to the limit open position D2, slide in the opening direction, and then come to slide in the closing direction. As the sliding speed of the shutter blades 31 and 32 and the rotating speed of the rotor 86 and the linking lever 37 are small, and their inertia is small, thus the shutter blades 31 and 32 have only a small delay before the change of the slide from the opening direction to the closing direction. Accordingly the surplus of the sliding amount in the slide in the opening direction is reduced. As a result, irregularity in the exposure amount is reduced even though there is irregularity in the operating characteristic. Irregularity in the exposure amount is reduced also when the exposure value EV according to the subject brightness is smaller than the upper limit exposure value.

In the above embodiment, the motor of the moving magnet type is used to actuate the shutter blades. Of course any suitable type of motor may be used. In the above embodiment, the shutter blades are slid. Instead, rotatable shutter blades may be used. A rotational angle of their rotation may be changed to change an opening diameter of the shutter opening. In the above embodiment, the shutter device is used in the instant camera. Alternatively a shutter device of the present invention may be used in a camera suitable for 135-type of a photo film.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A shutter device including an exposure opening, and at least one shutter blade for moving in an opening direction to a maximum open position to open said exposure opening so as to provide an exposure, then said shutter blade moving in a closing direction to close said exposure opening, an opening diameter being determined in accordance with said maximum open position, said opening diameter being controlled smaller according to highness of subject brightness, said shutter device comprising:

an actuator for moving said shutter blade in said opening direction;

a position detector for detecting a reach of said shutter blade to a reference position while said actuator moves said shutter blade in said opening direction;

a controller for obtaining a timer time in accordance with said subject brightness, for starting measuring elapsed time in response to a signal from said position detector, and for changing over said actuator when said measured elapsed time comes up to said timer time while said shutter blade is moved further in said opening direction, thereafter said shutter blade being moved by inertia to said maximum open position, and then moved in said closing direction; and wherein said reference position is so predetermined that said maximum open position is changeable in a range limited by one limit open position located in said closing direction, wherein said shutter blade, when located in said limit open position, opens said exposure opening to a small extent, so as to ensure opening operation of said shutter blade for said exposure opening even when said timer time is small;

wherein said reference position is predetermined by sequential steps of moving said shutter blade by said actuator in said opening direction, changing over said actuator in response to a reach of said shutter blade to said reference position in said opening direction, and then moving said shutter blade by inertia so as to move to said limit open position.

2. A shutter device as defined in claim 1, wherein said limit open position is associated with a smallest value in a tolerable range of said opening diameter for providing exposure optimally.

3. A shutter device as defined in claim 2, wherein said reference position is offset in said opening direction from a position which said shutter blade reaches to start opening said exposure opening.

4. A shutter device as defined in claim 1, wherein said reference position is determined a position which said shutter blade reaches to start opening said exposure opening.

5. A shutter device as defined in claim 1, further comprising a bias member for biasing said at least one shutter blade in said closing direction, wherein said at least one shutter blade, when said actuator is turned on, is moved in said opening direction, and when said actuator is turned off, is moved by said inertia to said maximum open position against said bias member, and then is moved by said bias member in said closing direction.

6. A shutter device as defined in claim 5, further comprising a projection, disposed on said at least one shutter blade, to project laterally with reference to a moving path of said shutter blade;

wherein said position detector includes a photo sensor, disposed in a moving path of said projection, for photoelectrically detecting said projection.

7. A shutter device as defined in claim 6, wherein said actuator is a solenoid.

8. A shutter device as defined in claim 7, wherein the at least one shutter blade comprises first and second shutter blades;

said shutter device further comprising:
a linking lever, supported rotatably, having first and second ends, said first end being secured to said first shutter blade, said second end being secured to said second shutter blade, wherein rotation of said linking lever causes the first shutter blade and the second shutter blade to move in opposite directions; and first and second recesses, formed in said first and second shutter blades, respectively, which together define an aperture over said exposure opening, a size of said aperture increasing when said first and second shutter blades are moved in said opening direction, and decreasing when said first and second shutter blades are moved in said closing direction.

9. A shutter device including an exposure opening and at least one shutter blade adapted to move in an opening direction to a maximum open position to uncover the exposure opening, then to move in a closing direction to cover the exposure opening, an opening diameter being determined in accordance with the maximum open position, the opening diameter being controlled to decrease with increasing subject brightness, the shutter device comprising:

a subject brightness measuring device;
an actuator connected to the at least one shutter blade to be able to induce movement of the shutter blade in at least the opening direction;
a position detector capable of detecting a position of the shutter blade and producing an indication signal when the shutter blade has reached a reference position as the shutter moves in the opening direction; and
a controller which receives the indication signal from the position detector and controls the actuator, said controller including a timer to measure elapsed time, said controller receiving an input from the subject brightness measuring device;
wherein for each exposure, the controller causes the actuator to move the at least one shutter blade in the opening direction and begins measuring elapsed time using the timer upon receiving the indication signal, the controller no longer causing the actuator to move the at least one shutter blade in the opening direction when the elapsed time reaches a timer time, the timer time being based on the input from the subject brightness measuring device, inertia of the at least one shutter blade causing the at least one shutter blade to continue to move in the opening direction after no longer being driven, the inertial movement of the at least one shutter blade varying between a predetermined minimum and maximum amount.

10. A shutter device as defined in claim 9, wherein said actuator, when operated in a forward direction, moves said shutter blade in said opening direction, and when operated in a reverse direction, moves said shutter blade in said closing direction;

said shutter device further comprising:
a speed reducer for regulating operation of said actuator, to reduce a moving speed of said shutter blade; and
a clutch mechanism, displaced in accordance with an operating state of said actuator, for connecting said actuator with said speed reducer when said actuator is operated in said forward direction, and for disconnecting said actuator from said speed reducer when said actuator is operated in said reverse direction.

11. A shutter device as defined in claim 10, wherein said actuator is a motor, and said motor, when supplied with a first drive current, is rotated in said forward direction, and when supplied with a second drive current flowing in reverse to said first drive current, allows said inertia to move said shutter blade to said maximum open position, and then is rotated in said reverse direction.

12. A shutter device as defined in claim 11, wherein said clutch mechanism includes:

a projection member, secured to a rotor shaft of said motor, to project radially; and
a clutch lever, disposed rotatably, having first and second ends, said first end being connected with said speed reducer, said second end being disposed in a rotational orbit of said projection member, and pushed by said projection member when said motor is rotated in said forward direction.

13. A shutter device as defined in claim 12, wherein said clutch lever includes a sector gear formed on said first end;

said speed reducer including:
a gear meshed with said sector gear; and
a flywheel, disposed coaxially with said gear, having a great mass, for reducing rotating speed of said lever by inertia thereof.

14. A shutter device as defined in claim 12, wherein said clutch lever includes a sector gear formed on said first end;

said speed reducer including:
a gear meshed with said sector gear; and
a spring for biasing said gear in a rotational direction to reduce a rotating speed of said lever in one direction, said one direction being associated with said forward direction of said motor.

15. A shutter device as defined in claim 9, wherein said actuator is a motor, including:

a rotor, disposed rotatably, and having first and second magnetic poles directed opposite to each other with respect to a central axis of rotation thereof; and
a stator, having first and second stator arms, which are confronted with each other, and between which said rotor is disposed, said stator being supplied with a first drive current and a second drive current flowing in reverse thereto, for generating magnetic field thereabout, wherein said first stator arm attracts one of said first and second magnetic poles, and said second stator arm attracts a remaining one of said first and second magnetic poles, so as to rotate said rotor in an angular range smaller than one rotation in said forward and reverse directions.

16. A shutter device as defined in claim 15, wherein the at least one shutter blade comprises first and second shutter blades;

further comprising a linking lever, coupled directly with a rotor shaft of said rotor, having first and second ends, said first end being secured to said first shutter blade, said second end being secured to said second shutter blade, wherein rotation of said linking lever causes the first shutter blade and the second shutter blade to move in opposite directions.

17. A shutter device for a camera, including an exposure opening and at least one shutter blade, wherein said exposure opening is gradually opened to increase an opening diameter when said shutter blade moves in an opening direction, and then closed when said shutter blade moves in a closing direction, said shutter device comprising:

an actuator for moving said shutter blade in said opening direction;

a position detector for detecting passage of said shutter blade at a reference position while said shutter blade is moved in said opening direction;

a controller for obtaining a timer time in accordance with subject brightness, for starting measuring elapsed time in response to a signal from said position detector, and for changing over said actuator when said measured elapsed time comes up to said timer time, in order to start closing operation of said shutter blade; and wherein said reference position is so predetermined that, even when said timer time is zero, said opening diameter of a predetermined minimum is obtained.

18. A shutter device as defined in claim 16 wherein said actuator comprises a motor for rotating forward to move said at least one shutter blade in said opening direction, and for rotating in reverse to move said at least one shutter blade in said closing direction.

19. A shutter device as defined in claim 18, wherein said shutter blade has response with delay, and said position detector is adjusted to be positioned in consideration of said response with delay in predetermining said reference position.

20. A shutter device as defined in claim 19, further comprising a member for driving said at least one shutter blade, said motor having a rotor shaft coupled with said member.

21. A shutter device as defined in claim 20, further comprising a speed regulator mechanism for reducing a moving speed of said shutter blade in said opening direction.

* * * * *